US012402643B2

(12) United States Patent
Boerefijn et al.

(10) Patent No.: US 12,402,643 B2
(45) Date of Patent: Sep. 2, 2025

(54) FAT COMPOSITION

(71) Applicant: Bunge Loders Croklaan B.V., Wormerveer (NL)

(72) Inventors: Renee Boerefijn, Wormerveer (NL); Martin Aalberts, Wormerveer (NL); Erik Paul Alosin Berenschot, Wormerveer (NL); Jeanine Luvelle Werleman, Wormerveer (NL)

(73) Assignee: BUNGE LODERS CROKLAAN B.V., Wormerveer (NL)

( * ) Notice: Subject to any disclaimer, the term of this patent is extended or adjusted under 35 U.S.C. 154(b) by 489 days.

(21) Appl. No.: 17/636,405

(22) PCT Filed: Aug. 18, 2020

(86) PCT No.: PCT/EP2020/073083
§ 371 (c)(1),
(2) Date: Feb. 18, 2022

(87) PCT Pub. No.: WO2021/032731
PCT Pub. Date: Feb. 25, 2021

(65) Prior Publication Data
US 2022/0295812 A1 Sep. 22, 2022

(30) Foreign Application Priority Data
Aug. 20, 2019 (EP) ..................................... 19192555

(51) Int. Cl.
| A23D 9/013 | (2006.01) |
| A23D 9/02 | (2006.01) |
| A23G 1/36 | (2006.01) |
| A23G 1/54 | (2006.01) |
| A23G 3/40 | (2006.01) |

(52) U.S. Cl.
CPC ............... *A23D 9/013* (2013.01); *A23D 9/02* (2013.01); *A23G 1/36* (2013.01); *A23G 1/545* (2013.01); *A23G 3/40* (2013.01); *A23V 2002/00* (2013.01)

(58) Field of Classification Search
CPC . A23D 9/013; A23D 9/02; A23G 1/36; A23G 1/545; A23G 3/40; A23V 2002/00
See application file for complete search history.

(56) References Cited

U.S. PATENT DOCUMENTS

| 2006/0172057 A1 | 8/2006 | Cleenwerck |
| 2012/0263853 A1* | 10/2012 | Doucet .................. A23D 7/013 426/549 |
| 2014/0363543 A1 | 12/2014 | Ball et al. |
| 2017/0071224 A1* | 3/2017 | Bhaggan .................. A23G 1/38 |

FOREIGN PATENT DOCUMENTS

| EP | 0744899 A1 | 12/1996 | |
| EP | 744900 A1 * | 12/1996 | ............. A23D 7/011 |
| EP | 1402784 A1 | 3/2004 | |
| EP | 1424907 A1 | 6/2004 | |
| EP | 1803819 A2 | 7/2007 | |
| EP | 2749173 A1 | 7/2014 | |
| JP | 2006-273925 A | 10/2006 | |
| WO | 95/22256 A1 | 8/1995 | |
| WO | 95/22257 A1 | 8/1995 | |
| WO | 03/024237 A1 | 3/2003 | |
| WO | 2007/097523 A2 | 8/2007 | |
| WO | 2008/035968 A2 | 3/2008 | |
| WO | 2013/027731 A1 | 2/2013 | |
| WO | 2013/131861 A1 | 9/2013 | |
| WO | 2014/092531 A2 | 6/2014 | |

OTHER PUBLICATIONS

International Search Report issued in corresponding International Patent Application No. PCT/EP2020/073083 dated Nov. 3, 2020.
Written Opinion issued in corresponding International Patent Application No. PCT/EP2020/073083 dated Nov. 3, 2020.
Communication issued Jun. 28, 2023 for counterpart Chinese Patent Application No. 202080041180.1 (See English Translation).
Murui et al., "Determination of Triacylglycerol Composition of Vegetable Oil and Application to Identifying the Components of Oil-Admixture," Journal of Japan Oil Chemists' Society, 45 (1) (1996) (see English abstract).
Office Action issued in Japanese Patent Application No. 2022-502499 dated Jul. 30, 2024.
Office Action issued in Japanese Patent Application No. 2022-502499 dated Jan. 28, 2025.

* cited by examiner

Primary Examiner — Erik Kashnikow
Assistant Examiner — Assaf Zilbering
(74) Attorney, Agent, or Firm — Morgan, Lewis & Bockius LLP

(57) ABSTRACT

A fat composition comprises: from 10% to 30% by weight of diglycerides; and from 70% to 90% by weight of triglycerides, wherein the triglycerides comprise from 40% to 75% by weight of CN50 triglycerides and from 15% to 40% by weight of CN52 triglycerides; based on total triglycerides present in the composition; and wherein the fat composition has from 55 to 85 solid fat content at 10° C.; and from 35 to 70 solid fat content at 20° C.; and from 5 to 25 solid fat content at 30° C.; and from 0 to 10 solid fat content at 40° C.; measured on 20° C. stabilized fat according to ISO 8292-1.

11 Claims, No Drawings

FAT COMPOSITION

This invention relates to a fat composition, uses thereof, a process to produce the fat composition and a confectionery product comprising the fat composition.

BACKGROUND

Fats and oils are important ingredients of food products such as confectionery products. Fats and oils contain predominantly triglycerides, but also partial glycerides such as diglycerides. Fats and oils contribute directly or indirectly to the functionality of confectionery products in relation to their compositions.

Confectionery products are sweet and sugar is the most commonly used sweetener in confectionery products. However, public health concern is increased due to its significant caloric contribution to the diet and the rise of overweight and obese populations all over the world.

This leads the food industry to reduce the amount of sugar used in many foods and beverages. However, this is not a simple formulation change due to potential differences in taste, sweetness intensity and duration and loss of texture since sugar plays an important and complex role in confectionery products.

EP A1 0 744 900 discloses fat-blends suitable for food applications, comprising blends of: 10-60% diglycerides (=A), 90-40% triglycerides (=B) wherein (A) contains >/=70% SU-diglycerides, including high melting diglycerides (>40 DEG C.) (=C) and simultaneously a fatty compound (D) so that the melting point of (C+D) is >/=5 DEG C., lower than the melting point of (C) wherein (B) has an N5</=40 while the total blend has a SAFA-content<40%.

EP A1 0 744 899 provides fat blends suitable for food application, in particular for wrapper- or tub spreads, comprise: 30-70 of diglycerides, 70-30 of triglycerides wherein the diglycerides comprises: 25-70% SU, 10-70% UU, less than 30% of SS (S=saturated fatty acid C12-C24; U=unsaturated fatty acid>/=C16) and wherein the triglycerides contain 1-70 wt. % of S2U-triglycerides, while the SAFA-content of the blend is less than 50 wt. %.

WO 2013/027731 A1 provides an oil or fat composition which contains 50 mass % or more of diacylglycerols, in said diacylglycerols, the content of fatty acids having 20 or more carbon atoms being 12 mass % or more relative to the total constituting fatty acids thereof and the sum of the contents of eicosapentaenoic acid and docosahexaenoic acid being 5 mass % or less relative to the total constituting fatty acids thereof, and has an iodine value of the oil or fat of 120 or less.

EP A1 2 749 173 provides a fat or oil composition, comprising 50 mass % or more of diacylglycerols satisfying the following (1) to (4): (1) 3 to 40 mass % of a disaturated diacylglycerol (SS) in the diacylglycerols; (2) 21 to 48 mass % of a monosaturated-monounsaturated diacylglycerol (SU) in the diacylglycerols; (3) 0.5 to 3.8 as a ratio (mass ratio) [(SU)/(SS)] of a content of the monosaturated-monounsaturated diacylglycerol (SU) in the diacylglycerols relative to a content of the disaturated diacylglycerol (SS) in the diacylglycerols; and (4) 9.7 or less as a mass ratio [(P)/(S)] of a content of a saturated fatty acid having 16 carbon atoms (P) relative to a content of a saturated fatty acid having 18 carbon atoms (S), in constituent fatty acids of the diacylglycerols.

EP A1 1 424 907 provides an oil composition comprising the following components (A) and (B):(A) 15 to 70% by weight of diglycerides, in which less than 15% by weight of the constitutive fatty acids are ω3 type unsaturated fatty acids; and (B) 30 to 85% by weight of a triglyceride in which at least 15% by weight of the constitutive fatty acids are ω3 type unsaturated fatty acids.

WO 2007/097523 A2 discloses a fat composition and methods for preparing the fat composition. The fat composition comprises (a) 10 to 95% by weight of a triglyceride in which palmitic acid or stearic acid is bonded in the 2-position and is present in an amount of 25 to 95% by weight with respect to the weight of constituent fatty acids, (b) 4.5 to 80% by weight of a triglyceride in which medium-chain fatty acids are bonded in the 1,3-positions and are present in an amount of 1 to 50% by weight with respect to the weight of constituent fatty acids, and (c) 0.1 to 85% by weight of a diglyceride in which unsaturated fatty acids are bonded in the 1,2-positions or 1,3-positions and are present in an amount of 30 to 95% by weight with respect to the weight of constituent fatty acids.

EP A2 1 803 819 provides a process for producing a diacylglycerol, which comprises, reacting triacylglycerol with water and an enzyme to obtain a mixture comprising of diacylglycerol, monoacylglycerol and free fatty acid; removing water content in the mixture by way of dehydration; and separating monoacylglycerol, free fatty acid and residual triacylglycerol by at least one separation method to obtain a high-purity diacylglycerol. An oil or fat composition comprising of diacylglycerol obtained from the said process and phytosteryl esters and/or ferulic acid esters in an amount of from 0.5% to 25% by weight of diacylglycerol is also provided.

There remains a need for fat composition which can be used to make a confectionery product such as a filling with a reduced amount of sugar while the desirable organoleptic properties, particularly sweetness intensity, can still be maintained and the texture of the product is still acceptable.

DESCRIPTION OF THE INVENTION

According to the present invention, there is provided a fat composition comprising from 10% to 30% by weight of diglycerides; and from 70% to 90% by weight of triglycerides, wherein the triglycerides comprise from 40% to 75% by weight of CN50 triglycerides and from 15% to 40% by weight of CN52 triglycerides; based on total triglycerides present in the composition; and wherein the fat composition has from 55 to 85 solid fat content at 10° C.; and from 35 to 70 solid fat content at 20° C.; and from 5 to 25 solid fat content at 30° C.; and from 0 to 10 solid fat content at 40° C.; measured on 20° C. stabilized fat according to ISO 8292-1.

The fat composition of this invention has been found to be particularly useful as an ingredient for confectionery products containing a reduced amount of sugar compared to conventional products, such as less than 35% by weight of sugar or even less than 30% by weight of sugar in the confectionery products. Fat compositions according to the invention provide a confectionery product with not only good texture properties but also surprisingly similar organoleptic properties to otherwise identical compositions without the sugar reduction. In particular, the fat composition according to the invention provides good sweetness intensity properties in confectionery products, such as confectionery fillings.

The fat composition of the invention may be made from naturally occurring or synthetic fats, fractions of naturally occurring or synthetic fats, or mixtures thereof, that satisfy the requirements for fatty acids and solid fat contents defined herein.

The term "fat" refers to glyceride fats and oils containing fatty acid acyl groups and does not imply any particular melting point. The term "oil" is used synonymously with "fat".

The term "fatty acid" refers to straight chain saturated or unsaturated (including mono- and poly unsaturated) carboxylic acids having from 8 to 24 carbon atoms. A fatty acid having x carbon atoms and y double bonds may be denoted Cx:y. For example, palmitic acid may be denoted C16:0 and oleic acid may be denoted C18:1. Percentages of fatty acids in compositions referred to herein include acyl groups in tri-, di- and mono-glycerides present in the glycerides and are based on the total weight of C8 to C24 fatty acids. The fatty acid profile (i.e., composition) may be determined, for example, by fatty acid methyl ester analysis (FAME) using gas chromatography according to ISO 12966-2 and ISO 12966-4.

The term "triglyceride" refers to glycerides consisting of three fatty acid chains covalently bonded to a glycerol molecule. The term "diglyceride" refers to a glyceride consisting of two fatty acid chains covalently bonded to a glycerol molecule, not necessarily limited to specific positions on the glycerol backbone (1,3- or 2-positions). Triglyceride content and diglyceride content may be determined for example by high performance size exclusion chromatography according to ISO 18395:2005(E).

Triglyceride composition may be determined for example based on molecular weight differences (Carbon Number (CN)) by GC (AOCS Ce 5-86). The notation triglyceride CNxx denotes triglycerides having xx carbon atoms in the fatty acyl groups e.g., CN54 includes tristearin. Amounts of triglycerides specified with each carbon number (CN) as is customary terminology in the art are percentages by weight based on total triglycerides of CN26 to CN62 present in the fat composition.

The fat composition of this invention comprises from 10% to 30% by weight of diglycerides, preferably from 10% to 25% by weight, more preferably from 10% to 20% by weight and even more preferably from 15% to 20% by weight.

Diglyceride composition may be determined for example according to Lee et al. (1988), "Simple Method for Derivatization of Monoglycerides and Diglycerides" (J. Assoc. Off. Anal. Chem. Vol. 71, No. 4, 785-788). The notation diglyceride XY denotes diglycerides having fatty acid acyl groups X and Y at any of the 1-, 2- and 3-positions of the glyceride. The notation AB includes all the isomers such as 1,2-AB diglycerides, 1,3-AB diglycerides, 1,2-BA diglycerides and 1,3-BA diglycerides.

The fat composition according to the invention preferably comprises, based on the total diglycerides present in the composition one or more of:
from 30% to 45% by weight of PP diglycerides, more preferably 32% to 42%, such as 33% to 40%; and/or
from 5% to 20% by weight of PSt diglycerides, more preferably 6% to 16%, such as 7% to 13%; and/or
from 1% to 15% by weight of OO diglycerides, more preferably 2% to 12%, such as 3% to 10%; wherein P is palmitic acid, O is oleic acid and St is stearic acid.

For example, the fat composition may comprise from 30% to 45% by weight of PP diglycerides; and from 5% to 20% by weight of PSt diglycerides; and from 1% to 15% by weight of OO diglycerides; wherein P is palmitic acid, O is oleic acid and St is stearic acid.

More preferably, the fat composition according to the invention comprises from 32% to 42% by weight of PP diglycerides; and from 6% to 16% by weight of PSt diglycerides; and from 2% to 12% by weight of OO diglycerides; wherein P is palmitic acid, O is oleic acid and St is stearic acid.

Even more preferably, the fat composition according to the invention comprises from 33% to 40% by weight of PP diglycerides; and from 7% to 13% by weight of PSt diglycerides; and from 25% to 35% by weight of PO diglycerides; and from 1% to 5% by weight of PL diglycerides and from 3% to 10% by weight of OO diglycerides; wherein P is palmitic acid, O is oleic acid, St is stearic acid and L is linoleic acid.

The fat composition of this invention comprises, based on the total triglycerides present in the composition, from 40% to 75% by weight of CN50 triglycerides and from 15% to 40% by weight of CN52 triglycerides.

The fat composition of this invention preferably comprises, based on the total triglycerides present in the composition one or more of:
from 1% to 12% by weight of CN48 triglycerides, more preferably 3% to 10%, such as 4% to 9%; and/or
from 45% to 70% by weight of CN50, more preferably 50% to 65%, such as 55% to 60%; and/or
from 15% to 35% by weight of CN52 triglycerides, more preferably 20% to 30%, such as 22% to 28%.

For example, the fat composition may comprise from 1% to 12% by weight of CN48 triglycerides; and from 45% to 70% by weight of CN50; and from 15% to 35% by weight of CN52 triglycerides More preferably, the fat composition of this invention comprises, based on the total triglycerides present in the composition, from 3% to 10% by weight of CN48 triglycerides; and from 50% to 65% by weight of CN50 triglycerides; and from 20% to 30% by weight of CN52 triglycerides.

Even more preferably, the fat composition of this invention comprises, based on the total triglycerides present in the composition, from 4% to 9% by weight of CN48 triglycerides; and from 55% to 60% by weight of CN50 triglycerides; and from 22% to 28% by weight of CN52 triglycerides.

The fat composition according to the invention has from 55 to 85 solid fat content at 10° C.; and from 35 to 70 solid fat content at 20° C.; and from 5 to 25 solid fat content at 30° C.; and from 0 to 10 solid fat content at 40° C.; measured on 20° C. stabilized fat according to ISO 8292-1. The solid fat content is a percentage, so a solid fat content of x at y° C. means that x % of the fat is solid at y° C. according to ISO 8292-1.

Preferably, the fat composition of the invention has from 60 to 80 solid fat content at 10° C., more preferably from 65 to 75 and even more preferably from 68 to 74; measured on 20° C. stabilized fat according to ISO 8292-1.

Preferably, the fat composition of the invention has from 40 to 65 solid fat content at 20° C., more preferably from 45 to 60 and even more preferably from 50 to 60; measured on 20° C. stabilized fat according to ISO 8292-1.

Preferably, the fat composition of the invention has from 25 to 50 solid fat content at 25° C., more preferably from 30 to 45 and even more preferably from 35 to 40; measured on 20° C. stabilized fat according to ISO 8292-1.

Preferably, the fat composition of the invention has from 8 to 23 solid fat content at 30° C., more preferably from 10 to 20 and even more preferably from 12 to 18; measured on 20° C. stabilized fat according to ISO 8292-1.

Preferably, the fat composition of the invention has from 3 to 15 solid fat content at 35° C., more preferably from 4 to 12 and even more preferably from 5 to 10; measured on 20° C. stabilized fat according to ISO 8292-1.

Preferably, the fat composition of the invention has from 1 to 8 solid fat content at 40° C., more preferably from 2 to 7 and even more preferably from 3 to 6; measured on 20° C. stabilized fat according to ISO 8292-1.

In a preferred embodiment, the fat composition according to the invention comprises from 10% to 25% by weight of diglycerides, wherein the diglycerides comprise from 30.0% to 45.0% by weight of PP diglycerides; and from 5.0% to 20.0% by weight of PSt diglycerides; and from 1.0% to 15.0% by weight of OO diglycerides; based on total diglycerides present in the composition, wherein P is palmitic acid, O is oleic acid and St is stearic acid; and from 75% to 90% by weight of triglycerides, wherein the triglycerides comprise from 1% to 12% by weight of CN48 triglycerides; and from 45% to 70% by weight of CN50 triglycerides; and from 15% to 35% by weight of CN52 triglycerides; based on total triglycerides present in the composition; and wherein the fat composition has from 60 to 80 solid fat content at 10° C.; and from 40 to 65 solid fat content at 20° C.; and from 25 to 50 solid fat content at 25° C.; and from 8 to 23 solid fat content at 30° C.; and from 3 to 15 solid fat content at 35° C.; and from 1 to 8 solid fat content at 40° C.; measured on 20° C. stabilized fat according to ISO 8292-1.

In a more preferred embodiment, the fat composition according to the invention comprises from 10% to 20% by weight of diglycerides, wherein the diglycerides comprise from 32.0% to 42.0% by weight of PP diglycerides; and from 6.0% to 16.0% by weight of PSt diglycerides; and from 2.0% to 12.0% by weight of OO diglycerides; based on total diglycerides present in the composition, wherein P is palmitic acid, O is oleic acid and St is stearic acid; and from 80% to 90% by weight of triglycerides, wherein the triglycerides comprises from 3% to 10% by weight of CN48 triglycerides; and from 50% to 65% by weight of CN50 triglycerides; and from 20% to 30% by weight of CN52 triglycerides; based on total triglycerides present in the composition; and wherein the fat composition has from 65 to 75 solid fat content at 10° C.; and from 45 to 60 solid fat content at 20° C.; and from 30 to 45 solid fat content at 25° C.; and from 10 to 20 solid fat content at 30° C.; and from 4 to 12 solid fat content at 35° C.; and from 2 to 7 solid fat content at 40° C.; measured on 20° C. stabilized fat according to ISO 8292-1.

In an even more preferred embodiment, the fat composition according to the invention comprises from 15% to 20% by weight of diglycerides, wherein the diglycerides comprise from 33.0% to 40% by weight of PP diglycerides; and from 7.0% to 13% by weight of PSt diglycerides; and from 25.0% to 35.0% by weight of PO diglycerides; and from 1.0% to 5.0% by weight of PL diglycerides and from 3.0% to 10.0% by weight of OO diglycerides; wherein P is palmitic acid, O is oleic acid, St is stearic acid and L is linoleic acid; and from 80% to 85% by weight of triglycerides, wherein the triglycerides comprises from 4% to 9% by weight of CN48 triglycerides; and from 55% to 60% by weight of CN50 triglycerides; and from 22% to 28% by weight of CN52 triglycerides; based on total triglycerides present in the composition; and wherein the fat composition has from 68 to 74 solid fat content at 10° C.; and from 50 to 60 solid fat content at 20° C.; and from 35 to 40 solid fat content at 25° C.; and from 12 to 18 solid fat content at 30° C.; and from 5 to 10 solid fat content at 35° C.; and from 3 to 6 solid fat content at 40° C.; measured on 20° C. stabilized fat according to ISO 8292-1.

Preferably, the fat composition of the invention comprises from 0% to 5% by weight of lauric acid (C12:0), more preferably from 0% to 3% by weight and even more preferably from 0.01% to 2% by weight; said percentages of acid referring to acids bound as acyl groups in glycerides in the fat composition and being based on the total weight of C8 to C24 fatty acids.

Preferably, the fat composition of the invention comprises from 40% to 65% by weight of palmitic acid (C16:0), more preferably from 45% to 60% by weight and even more preferably from 50% to 55% by weight; said percentages of acid referring to acids bound as acyl groups in glycerides in the fat composition and being based on the total weight of C8 to C24 fatty acids.

Preferably, the fat composition of the invention comprises from 20% to 45% by weight of oleic acid (C18:1), more preferably from 25% to 40% by weight and even more preferably from 30% to 38% by weight; said percentages of acid referring to acids bound as acyl groups in glycerides in the fat composition and being based on the total weight of C8 to C24 fatty acids.

Preferably, the fat composition of the invention comprises from 50% to 75% by weight of saturated fatty acid (SAFA), more preferably from 55% to 70% by weight and even more preferably from 58% to 65% by weight; said percentages of acid referring to acids bound as acyl groups in glycerides in the fat composition and being based on the total weight of C8 to C24 fatty acids.

In a preferred embodiment, the fat composition of the invention comprises: from 0% to 5% by weight of lauric acid (C12:0); from 40% to 65% by weight of palmitic acid (C16:0); from 20% to 45% by weight of oleic acid (C18:1); and from 50% to 75% by weight of saturated fatty acid (SAFA); said percentages of acid referring to acids bound as acyl groups in glycerides in the fat composition and being based on the total weight of C8 to C24 fatty acids.

In a more preferred embodiment, the fat composition of the invention comprises from 0% to 3% by weight of lauric acid (C12:0); from 45% to 60% by weight of palmitic acid (C16:0); from 25% to 40% by weight of oleic acid (C18:1); and from 55% to 70% by weight of saturated fatty acid (SAFA); said percentages of acid referring to acids bound as acyl groups in glycerides in the fat composition and being based on the total weight of C8 to C24 fatty acids.

In an even more preferred embodiment, the fat composition of the invention comprises from 0.01% to 2% by weight of lauric acid (C12:0); from 50% to 55% by weight of palmitic acid (C16:0); from 30% to 38% by weight of oleic acid (C18:1); and from 58% to 65% by weight of saturated fatty acid (SAFA); said percentages of acid referring to acids bound as acyl groups in glycerides in the fat composition and being based on the total weight of C8 to C24 fatty acids.

Palm oil may be fractionated to separate various fractions depending on the melting behavior of the fractions. As is well known in the art, in general, palm stearin may be considered as a hard fraction of palm oil and palm olein may be considered as a soft fraction of palm oil. Palm mid fraction is a fraction between palm stearin and palm olein. A soft palm mid fraction may be obtained as a stearin fraction by fractionating palm olein. A hard palm mid fraction may be obtained as a stearin fraction by fractionating palm mid fraction.

The term "palm fraction" refers to any fraction obtained from palm oil by means of fractionation processing such as dry fractionation, solvent fraction and Lanza fractionation. To identify the different fractions, iodine value can be measured to indicate each fraction of palm oil. The term "iodine value" refers to the number of grams of iodine that could be added to 100 g of oil, which may be measured by various methods known in the art, such as AOCS Method cd 1-25.

The term "diglyceride-rich component" refers to an oil or fat composition comprising at least 10% by weight of diglycerides. The amount of diglycerides may be measured according to ISO 18395:2005 (E).

The fat composition according to the invention preferably comprises one or more palm fractions and one or more diglyceride-rich components which comprise from 15% to 50% by weight of diglycerides. More preferably, the fat composition according to the invention comprises one or more palm fractions and one or more diglyceride-rich components which comprise from 20% to 45% by weight of diglycerides. Even more preferably, the fat composition according to the invention comprises one or more palm fractions and one or more diglyceride-rich components which comprise from 25% to 45% by weight of diglycerides.

The fat composition according to the invention preferably comprises from 35% to 65% by weight of one or more palm fractions and from 35% to 65% by weight of one or more diglyceride-rich components which comprise from 15% to 50% by weight of diglycerides. More preferably, the fat composition according to the invention preferably comprises from 35% to 65% by weight of one or more palm fractions and from 35% to 65% by weight of one or more diglyceride-rich components which comprise from 20% to 45% by weight of diglycerides. Even more preferably, the fat composition according to the invention preferably comprises from 35% to 60% by weight of one or more palm fractions and from 40% to 65% by weight of one or more diglyceride-rich components which comprise from 20% to 45% by weight of diglycerides. Most preferably, the fat composition according to the invention preferably comprises from 35% to 60% by weight of one or more palm fractions and from 40% to 65% by weight of one or more diglyceride-rich components which comprise from 25% to 45% by weight of diglycerides.

Preferably, the fat composition according to the invention comprises at least one palm fraction with an iodine value from 40 to 45.

Preferably, the fat composition according to the invention comprises at least one palm fraction with an iodine value from 30 to 35.

In a preferred embodiment, the fat composition according to the invention comprises a palm fraction with an iodine value from 40 to 45 and a palm fraction with an iodine value from 30 to 35. In a more preferred embodiment, the fat composition according to the invention comprises from 10% to 70% by weight of a palm fraction with an iodine value from 40 to 45 and from 5% to 40% by weight of a palm fraction with an iodine value from 30 to 35.

A preferred fat composition comprises, and more preferably consists of, from 35% to 65% by weight of a diglyceride-rich component which comprises from 15% to 50% by weight of diglycerides, from 10% to 70% by weight of a palm fraction with an iodine value from 40 to 45 and from 5% to 40% by weight of a palm fraction with an iodine value from 30 to 35

An even more preferred fat composition comprises, and more preferably consists of, from 40% to 65% by weight of a diglyceride-rich component which comprises from 20% to 45% by weight of diglycerides, from 30% to 60% by weight of a palm fraction with an iodine value from 40 to 45 and from 10% to 20% by weight of a palm fraction with an iodine value from 30 to 35

In a preferred embodiment, one or more diglyceride-rich components in the fat composition according to the invention are made from one or more palm fractions. In a more preferred embodiment, one or more diglyceride-rich components in the fat composition according to the invention are made from one palm fraction with an iodine value from 30 to 35.

The invention also relates to a process for making the fat composition comprising blending one or more palm fractions and one or more diglyceride-rich components which comprise from 15% to 50% by weight of diglycerides. Preferably, the process for making the fat composition comprises blending one or more palm fractions and one or more diglyceride-rich components which comprise from 20% to 45% by weight of diglycerides.

The process of the invention preferably further comprises one or more steps of bleaching and/or deodorization of the components of the blend or the product after blending. The deodorization is carried out under reduced pressure and is preferably performed at a temperature of 220° C. or lower, more preferably at a temperature of 210° C. or lower and even more preferably at a temperature of 205° C. or lower.

Diglyceride-rich components may preferably be obtained by a method comprising:
a) providing an oil or fat;
b) hydrolyzing the oil or fat using an enzyme to form diglycerides, monoglycerides and free fatty acids; and
c) separating monoglycerides and free fatty acids from the diglycerides.

The oil or fat provided in step a) is preferably palm oil, more preferably a fraction obtained from palm oil and even more preferably a palm fraction with an iodine value from 40 to 45.

The hydrolysis of step b) may be catalyzed by an enzyme, preferably by a lipase and more preferably by lipase from *Candida rugosa*. The enzyme may be immobilized on a support material. The amount of enzyme as catalyst used in the hydrolysis may be from 0.01% to 2% by weight of the oil or fat to be hydrolyzed, preferably from 0.01% to 1% by weight and more preferably from 0.01% to 0.5% by weight. The amount of water used in the hydrolysis may be from 1% to 50% by weight of the oil or fat to be hydrolyzed, preferably from 2% to 40% by weight and more preferably from 5% to 30% by weight. The reaction temperature of hydrolysis may be from 20° C. to 70° C., preferably from 30° C. to 55° C. and more preferably from 35° C. to 40° C. The reaction time of hydrolysis may depend on the type of enzyme used, the amount of enzyme used and the reaction temperature, preferably from 30 minutes to 10 hours, more preferably from 1 hour to 8 hours and even more preferably from 2 hours to 5 hours.

The separation of step c) may be performed under reduced pressure and at an elevated temperature. The reduced pressure may be below 4 mbar, preferably below 1 mbar and more preferably below 0.5 mbar. The elevated temperature may be from 130° C. to 270° C., preferably from 150° C. to 250° C. and more preferably from 180° C. to 220° C. The separation is particularly preferred to be performed by means of short path distillation.

The free fatty acid content in the diglyceride-rich component after the separation of step c) is preferably lower than 1% by weight and more preferably lower than 0.6% by weight.

Optionally, after step c), further fractionation may be performed by means of dry fractionation or solvent fractionation to obtain an even more desired diglyceride composition in the diglyceride-rich component.

In a preferred embodiment, the process for making the fat composition comprises blending from 35% to 65% by weight of one or more palm fractions and from 35% to 65% by weight of one or more diglyceride-rich components which comprise from 15% to 50% by weight of diglycerides. In a more preferred embodiment, the process for making the fat composition comprises blending from 35% to 65% by weight of one or more palm fractions and from 35% to 65% by weight of one or more diglyceride-rich components which comprise from 20% to 45% by weight of diglycerides. In an even more preferred embodiment, the process for making the fat composition comprises blending from 35% to 60% by weight of one or more palm fractions and from 40% to 65% by weight of one or more diglyceride-rich components which comprise from 20% to 45% by weight of diglycerides. In a most preferred embodiment, the process for making the fat composition comprises blending from 35% to 60% by weight of one or more palm fractions and from 40% to 65% by weight of one or more diglyceride-rich components which comprise from 25% to 45% by weight of diglycerides.

Preferably, the process for making the fat composition comprises blending from 25% to 55% by weight of a palm fraction with an iodine value from 40 to 45; and from 5% to 35% by weight of a palm fraction with an iodine value from 30 to 35; and from 30% to 60% by weight of one or more diglycerides-rich components which comprise from 15% to 50% by weight of diglycerides.

More preferably, the process for making the fat composition comprises blending from 25% to 55% by weight of a palm fraction with an iodine value from 40 to 45; and from 5% to 35% by weight of a palm fraction with an iodine value from 30 to 35; and from 30% to 60% by weight of one or more diglycerides-rich components which comprise from 20% to 45% by weight of diglycerides.

Even more preferably, the process for making the fat composition comprises blending from 30% to 50% by weight of a palm fraction with an iodine value from 40 to 45; and from 10% to 30% by weight of a palm fraction with an iodine value from 30 to 35; and from 35% to 55% by weight of one or more diglycerides-rich components which comprise from 20% to 45% by weight of diglycerides.

Most preferably, the process for making the fat composition comprises blending from 30% to 50% by weight of a palm fraction with an iodine value from 40 to 45; and from 10% to 30% by weight of a palm fraction with an iodine value from 30 to 35; and from 35% to 55% by weight of one or more diglycerides-rich components which comprise from 25% to 40% by weight of diglycerides.

The invention also relates to the use of a fat composition according to the invention for a confectionery application, such as in a confectionery filling. Preferably, the use of the fat composition is for increasing the sweetness, such as the sweetness intensity, of the confectionery. Increasing the sweetness allows for the amount of sugar to be reduced. Therefore, the invention also provides the use of the fat composition in a reduced sugar confectionery application, such as a filling.

Confectionery products preferably comprise the fat composition of the invention, sugar, and other ingredients. The other ingredients may comprise one or more ingredients selected from dietary fibers such as inulin, fructo-oligosaccaride, polydextrose, sodium carboxymethyl cellulose, microcrystalline cellulose, methyl cellulose, methylethyl cellulose, or hydroxyl propyl cellulose, hydroxypropylmethyl cellulose, xanthan gum, pectin, sodium alginate, potassium alginate, ammonium alginate, calcium alginate, propylene glycol alginate, agar, carrageenan, raffinose, xylose, lactulose, gelatin, arabic gum, locust bean gum, guar gum, dextran, xanthan or glucan; low calorie high intensity sweeteners such as aspartame, acesulfame-K, neotame, saccharin, sucralose, cyclamate or alitame; milk powder; milk fat; cocoa powder; cocoa mass; flavor ingredients such as vanillin; and emulsifiers such as lecithin or polyglycerol polyricinoleate.

In a preferred embodiment, the fat composition of the invention is used for (or may be suitable for use in) confectionery filling. The confectionery filling produced using the fat composition of the invention has been found to have similar organoleptic properties such as sweetness intensity while the amount of sugar is reduced. Confectionery filling may comprise the fat composition of the invention, sugar and one or more other ingredients selected from dietary fibers such as inulin, fructo-oligosaccaride, polydextrose, sodium carboxymethyl cellulose, microcrystalline cellulose, methyl cellulose, methylethyl cellulose, or hydroxypropyl cellulose, hydroxypropyl methyl cellulose, xanthan gum, pectin, sodium alginate, potassium alginate, ammonium alginate, calcium alginate, propylene glycol alginate, agar, carrageenan, raffinose, xylose, lactulose, gelatin, arabic gum, locust bean gum, guar gum, dextran, xanthan or glucan; low calorie high intensity sweeteners such as aspartame, acesulfame-K, neotame, saccharin, sucralose, cyclamate or alitame; milk powder; milk fat; cocoa powder; cocoa mass; flavor ingredients such as vanillin; and emulsifiers such as lecithin or polyglycerol polyricinoleate.

The invention also relates to a confectionery product comprising from 20% to 50% by weight of a fat composition of the invention; from 15% to 35% by weight of sugar; and from 15% to 65% by weight of other ingredients selected from dietary fibers such as inulin, fructo-oligosaccaride, polydextrose, sodium carboxymethyl cellulose, microcrystalline cellulose, methyl cellulose, methylethyl cellulose, or hydroxypropyl cellulose, hydroxypropylmethyl cellulose, xanthan gum, pectin, sodium alignate, potassium alginate, ammonium alginate, calcium aliginate, propylene glycol alginate, agar, carrageenan, raffinose, xylose, lactulose, gelatin, arabic gum, locust bean gum, guar gum, dextran, xanthan or glucan; low calorie high intensity sweeteners such as aspartame, acesulfame-K, neotame, saccharin, sucralose, cyclamate or alitame; milk powder; milk fat; cocoa powder; cocoa mass; flavor ingredients such as vanillin; and emulsifiers such as lecithin or polyglycerol polyricinoleate.

The confectionery product comprising the fat composition of the invention preferably comprises at least 5% by weight of one or more of milk power, vegetable milk powder, dairy powder or mixtures thereof.

In a preferred embodiment, a confectionery product according to the invention comprises from 20% to 50% by weight of fat composition of the invention; from 15% to 35% by weight of sugar; and from 5% to 25% by weight of dietary fibers. More preferably, a confectionery product according to the invention comprises from 25% to 45% by weight of fat composition of the invention; from 20% to 30% by weight of sugar; and from 10% to 20% by weight of inulin. Even more preferably, a confectionery product according to the invention comprises from 25% to 45% by weight of fat composition of the invention; from 20% to 30% by weight of sugar; from 5% to 15% by weight of milk powder and from 10% to 20% by weight of inulin.

Typically, the confectionery products of the invention contain less than 20% by weight of added water, preferably less than 10% by weight of added water, more preferably less than 5% by weight of added water and even more preferably less than 1% by weight added water. Most preferably, no added water is present in the confectionery products.

Further provided by the invention is a method of making the confectionery product of the invention comprising combining from 20% to 50% by weight of the fat composition of the invention with from 15% to 35% by weight of sugar and from 15% to 65% by weight of other ingredients. 15 to 35% by weight of sugar is relatively low for confectionery products: although recipes may vary, many conventional confectionery products will have over 40% by weight sugar content in order to provide the desired sweetness intensity when consumed.

Also provided by the invention is the use of the fat composition of the invention for maintaining the sweetness intensity in a confectionery product while the amount of sugar is reduced, such as only 15% to 35% by weight of sugar used in a confectionery product, wherein the confectionery product is preferably a filling.

The listing or discussion of an apparently prior-published document in this specification should not necessarily be taken as an acknowledgement that the document is part of the state of the art or is common general knowledge.

Preferences and options for a given aspect, embodiment, feature or parameter of the invention should, unless the context indicates otherwise, be regarded as having been disclosed in combination with any and all preferences and options for all other aspects, embodiments, features and parameters of the invention.

The following non-limiting examples illustrate the invention and do not limit its scope in any way. In the examples and throughout this specification, all percentages, parts and ratios are by weight unless indicated otherwise.

EXAMPLES

Example 1

3 kg hard palm mid fraction (Iodine value from 33 to 35 measured by the AOCS Method Cd 1-25) was partially enzymatically hydrolyzed. The fat, after having been melted, was mixed with 25% (w/w) demineralized water and 0.05% (w/w) Lipase AY produced from *Candida rugosa* (obtained from Amano Enzyme) as a catalyst at 38° C. After 4 hours, hot demineralized water was added and the temperature was increased to 80-90° C. to inactivate the lipase. The water layer was removed. The oil was dried at reduced pressure and filtered. The free fatty acid (FFA) level was reduced to approximately 0.5% (w/w) by means of short path distillation (200° C., 0.01 mbar). The residual fat was then obtained as Diglyceride-rich Component A and the analytical results of this component are shown in Table 1.

Diglyceride-rich Component A was blended with soft palm mid fraction (Iodine value from 40 to 43 measured by the AOCS Method Cd 1-25) and hard palm mid fraction (Iodine value from 33 to 35 measured by the AOCS Method Cd 1-25) in a weight ratio of 46/40/14 (Diglyceride-rich Component A/Soft palm mid fraction/Hard palm mid fraction). This blend was obtained as Fat A after bleaching and deodorization at up to 205° C. The analytical results of Fat A are shown in Table 1.

A commercial fat product, fully refined Creamelt® 600 (obtained from Bunge Loders Croklaan B.V., the Netherlands) was used as a reference fat. The analytical results of this fat are shown in Table 1.

TABLE 1

| | Diglyceride-rich Component A | Fat A | Creamelt ® 600 - Reference fat |
|---|---|---|---|
| Polymers[1] | 0.2 | 0.4 | 0.5 |
| Triglycerides[1] | 63.8 | 80.6 | 92.9 |
| Diglycerides[1] | 35.6 | 18.7 | 6.2 |
| Monoglycerides[1] | 0.1 | 0.2 | 0.1 |
| Free fatty acids[1] | 0.3 | 0.1 | 0.1 |
| S20-N10[2] | 67.2 | 72.5 | 69.7 |
| S20-N20[2] | 48.8 | 55.9 | 54.8 |
| S20-N25[2] | 42.8 | 38.7 | 33.5 |
| S20-N30[2] | 27.6 | 14.5 | 8.8 |
| S20-N35[2] | 16.7 | 7.5 | 1.3 |
| S20-N40[2] | 10.0 | 4.1 | 0.0 |
| C8:0[3] | 0.0 | 0.0 | 0.0 |
| C10:0[3] | 0.0 | 0.0 | 0.0 |
| C12:0[3] | 0.1 | 0.1 | 0.3 |
| C14:0[3] | 1.0 | 0.9 | 1.1 |
| C15:0[3] | 0.1 | 0.1 | 0.1 |
| C16:0[3] | 55.0 | 52.9 | 50.3 |
| C17:0[3] | 0.2 | 0.1 | 0.1 |
| C18:0[3] | 7.7 | 6.7 | 5.1 |
| C18:1[3] | 32.4 | 34.0 | 35.3 |
| C18:2[3] | 2.7 | 4.2 | 6.8 |
| C18:3[3] | 0.0 | 0.1 | 0.2 |
| C20:0[3] | 0.7 | 0.6 | 0.4 |
| C22:0[3] | 0.1 | 0.1 | 0.1 |
| C24:0[3] | 0.1 | 0.1 | 0.1 |
| SAFA[4] | 64.8 | 61.6 | 57.5 |
| MUFA[5] | 32.4 | 34.1 | 35.5 |
| PUFA[6] | 2.7 | 4.2 | 7.0 |
| IV FAME[7] | 32.6 | 36.8 | 42.8 |
| TRANS[8] | 0.2 | 0.2 | 0.2 |

In the above table:
1. Polymers/Triglyceride/Diglyceride/Monoglyceride/Free fatty acid determined according to ISO 18395: 2005(E);
2. S20-Nx refers to solid fat content determined by NMR on stabilized fat (stabilized at 20° C. for 24 hours) measured at x° C. according to ISO 8292-1.
3. Cx:y refers to a fatty acid having x carbon atoms and y double bonds; levels determined by GC-FAME (ISO 12966-2: 2014 and ISO 12966-4: 2015)
4. SAFA refers to saturated fatty acids;
5. MUFA refers to mono-unsaturated fatty acid;
6. PUFA refers to poly-unsaturated fatty acid;
7. IV FAME refers to calculated iodine value according to AOCS Cd 1c-85;
8. TRANS refers to trans fatty acids: unsaturated fatty acids having a double bond in a trans arrangement.

Example 2

The triglyceride compositions of Diglyceride-rich Component A, Fat A and Creamelt® 600 (Reference fat) were analyzed. The results are shown in Table 2.

TABLE 2

| | Diglyceride-rich Component A | Fat A | Creamelt ® 600 - Reference fat |
|---|---|---|---|
| CN26 | 0.0 | 0.0 | 0.1 |
| CN28 | 0.0 | 0.0 | 0.1 |
| CN30 | 0.2 | 0.1 | 0.2 |
| CN32 | 0.2 | 0.1 | 0.1 |
| CN34 | 1.0 | 0.6 | 0.7 |
| CN36 | 0.6 | 0.5 | 0.8 |
| CN38 | 0.4 | 0.2 | 0.4 |
| CN40 | 0.2 | 0.2 | 0.2 |
| CN42 | 0.1 | 0.1 | 0.2 |
| CN44 | 0.3 | 0.3 | 0.5 |

TABLE 2-continued

|     | Diglyceride-rich Component A | Fat A | Creamelt ® 600 - Reference fat |
|-----|------------------------------|-------|-------------------------------|
| CN46 | 0.9 | 1.0 | 0.9 |
| CN48 | 10.7 | 7.2 | 5.2 |
| CN50 | 48.1 | 57.7 | 56.7 |
| CN52 | 30.1 | 26.0 | 27.6 |
| CN54 | 6.7 | 5.5 | 6.1 |
| CN56 | 0.5 | 0.4 | 0.3 |
| CN58 | 0.0 | 0.0 | 0.0 |

In the above table:
CNxx refers to a triglyceride having xx carbon atoms; levels determined by GC according to AOCS Ce 5-86 (1997) with pretreatment to remove mono- and di-glycerides.

Example 3

The diglyceride compositions of Diglyceride-rich Component A, Fat A and Creamelt® 600 (Reference fat) were analyzed according to Lee et al.—"Simple Method for Derivatization of Monoglycerides and Diglycerides" (J. Assoc. Off. Anal. Chem. Vol. 71, No. 4, 785-788, 1988). The results are shown in Table 3.

TABLE 3

|     | Diglyceride-rich Component A | Fat A | Creamelt ® 600 - Reference fat |
|-----|------------------------------|-------|-------------------------------|
| PP  | 38.2 | 36.7 | 27.3 |
| PSt | 10.9 | 10.2 | 4.9 |
| PO  | 30.8 | 31.6 | 33.1 |
| PL  | 2.5 | 3.2 | 8.6 |
| StO | 4.8 | 4.7 | 3.3 |
| OO  | 6.2 | 6.7 | 10.9 |

In the above table:
O, P, St and L refer to oleic, palmitic, stearic and linoleic acids, respectively;
Diglyceride composition: PSt and other diglycerides were determined by chromatography according to Lee et al. (1988), wherein each peak includes diglycerides having the same fatty acids in different positions e.g., 1,2-PSt is in the same signal peak as 1,3-PSt, 1,2-StP and 1,3-StP.

Example 4

A reference chocolate filling (Reference filling) and a chocolate filling with 30% sugar reduced (Comparative filling) were produced with Creamelt® 600 (Reference fat). In the sugar reduced filling, part of the sugar (sucrose) is replaced by inulin, whereas the other ingredients are kept at the same amounts in the recipe. Inulin is a polysaccharide used as a dietary fiber in food products; it is essentially indigestible by human enzymes, and has a sweetness significantly lower than sucrose. Hence replacing part of the sucrose in a food product by inulin is expected to lower sensory attributes related to sweetness, and to lower the calorie value for human consumption. The ingredients according to Table 4 were mixed using a ball mill (W-1-S, Wiener B.V., the Netherlands) at a thermostat-controlled temperature of 55° C., and stirred at 240 rpm for 45 minutes. After mixing, the fillings were taken out and cooled to 23° C.

TABLE 4

| Ingredients (wt %) | Reference Filling | Comparative Filling |
|--------------------|-------------------|---------------------|
| Creamelt ® 600 (Reference fat) | 40 | 40 |
| Sugar (caster) | 40 | 28 |
| Inulin (Frutafit ® IQ) | — | 12 |
| Skimmed Milk Powder | 10 | 10 |
| Cocoa powder (alkalized) | 10 | 10 |
| Lecithin | 0.4 | 0.4 |

Example 5

A chocolate filling with 30% of the sugar reduced (Filling A) was produced with Fat A prepared in Example 1. The ingredients according to Table 5 were mixed using a ball mill (W-1-S, Wiener B.V., the Netherlands) at a thermostat-controlled temperature of 55° C., and stirred at 240 rpm for 45 minutes. After mixing, both fillings were taken out and cooled to 29.5° C.

TABLE 5

| Ingredients (wt %) | Filling A |
|--------------------|-----------|
| Fat A of Example 1 | 40 |
| Sugar (caster) | 28 |
| Inulin (Frutafit ® IQ) | 12 |
| Skimmed Milk Powder | 10 |
| Cocoa powder (alkalized) | 10 |
| Lecithin | 0.4 |

Example 6

A trained sensory panel (n=13) evaluated the test samples and scored the sensory attributes regarding sweetness intensity. The trained sensory panel observed a lower sweetness intensity of Comparative Filling compared to Reference Filling. Surprisingly, no significant difference regarding sweetness intensity was observed between Reference Filing and Filling A despite the fact that Filling A has a sugar content reduced by 30%.

It has also been observed that the texture and other organoleptic properties of filling A are still acceptable and comparable to the reference despite the fact that 30% less sugar was used.

The invention claimed is:

1. A fat composition comprising:
   from 10% to 30% by weight of diglycerides; and
   from 70% to 90% by weight of triglycerides, wherein the triglycerides comprise from 40% to 75% by weight of CN50 triglycerides and from 15% to 40% by weight of CN52 triglycerides; based on total triglycerides present in the composition;
   and
   wherein the fat composition has:
   from 55 to 85 solid fat content at 10° C.; and
   from 35 to 70 solid fat content at 20° C.; and
   from 5 to 25 solid fat content at 30° C.; and
   from 0 to 10 solid fat content at 40° C.;
   measured on 20° C. stabilized fat according to ISO 8292-1.

2. The fat composition according to claim 1, comprising from 10% to 25% by weight of diglycerides.

3. The fat composition according to claim 1, wherein the diglycerides comprise:
   from 30% to 45% by weight of PP diglycerides; and from 5% to 20% by weight of PSt diglycerides; and
from 1% to 15% by weight of OO diglycerides;
based on total diglycerides present in the composition,
wherein P is palmitic acid, O is oleic acid and St is stearic acid.

4. The fat composition according to claim 1, wherein the triglycerides comprise:
from 1% to 12% by weight of CN48 triglycerides; and
from 45% to 70% by weight of CN50 triglycerides; and
from 15% to 35% by weight of CN52 triglycerides;
based on total triglycerides present in the composition.

5. The fat composition according to claim 1, which has:
from 60 to 80 solid fat content at 10° C.; and/or
from 40 to 65 solid fat content at 20° C.; and/or
from 25 to 50 solid fat content at 25° C.; and/or
from 8 to 23 solid fat content at 30° C.; and/or
from 3 to 15 solid fat content at 35° C.; and/or
from 1 to 8 solid fat content at 40° C.;
measured on 20° C. stabilized fat according to ISO 8292-1.

6. The fat composition according to claim 1, which comprises:
from 0% to 5% by weight of lauric acid (C12:0); and/or
from 40% to 65% by weight of palmitic acid (C16:0); and/or
from 20% to 45% by weight of oleic acid (C18:1);
said percentages of acid referring to acids bound as acyl groups in glycerides in the fat composition and being based on the total weight of C8 to C24 fatty acids.

7. The fat composition according to claim 1, which comprises from 50% to 75% by weight saturated fatty acid (SAFA); said percentages of acid referring to acids bound as acyl groups in glycerides in the fat composition and being based on the total weight of C8 to C24 fatty acids.

8. The fat composition according to claim 1, wherein the composition comprises one or more palm fractions and one or more diglyceride-rich components comprising from 20% to 50% by weight of diglycerides.

9. The fat composition according to claim 1, wherein the composition comprises at least one palm fraction with an iodine value from 40 to 45 and/or at least one palm fraction with an iodine value from 30 to 35.

10. The fat composition according to claim 1, wherein the composition comprises one or more diglyceride-rich components made from one or more palm fractions.

11. The fat composition according to claim 7, which comprises from 55% to 70% by weight saturated fatty acid (SAFA); said percentages of acid referring to acids bound as acyl groups in glycerides in the fat composition and being based on the total weight of C8 to C24 fatty acids.

* * * * *